(12) United States Patent
Stegmann

(10) Patent No.: US 7,624,994 B2
(45) Date of Patent: Dec. 1, 2009

(54) METHOD FOR ADJUSTING THE AMOUNT OF AIR IN A CLOSED AIR SUPPLY SYSTEM FOR A CHASSIS

(75) Inventor: Axel Stegmann, Frankfurt am Main (DE)

(73) Assignee: Continental Aktiengesellschaft, Hannover (DE)

( * ) Notice: Subject to any disclaimer, the term of this patent is extended or adjusted under 35 U.S.C. 154(b) by 360 days.

(21) Appl. No.: 11/596,441

(22) PCT Filed: Apr. 25, 2005

(86) PCT No.: PCT/EP2005/051830

§ 371 (c)(1),
(2), (4) Date: Nov. 14, 2006

(87) PCT Pub. No.: WO2005/113272

PCT Pub. Date: Dec. 1, 2005

(65) Prior Publication Data

US 2007/0228676 A1    Oct. 4, 2007

(30) Foreign Application Priority Data

May 19, 2004    (DE) .................... 10 2004 025 340

(51) Int. Cl.
*B60G 17/015* (2006.01)
*B60G 17/04* (2006.01)
(52) U.S. Cl. ........... 280/5.514; 280/6.157; 280/124.161
(58) Field of Classification Search ............ 280/5.514, 280/6.157, 124.161; 701/37
See application file for complete search history.

(56) References Cited

U.S. PATENT DOCUMENTS

| 4,659,104 | A | * | 4/1987 | Tanaka et al. ............ 280/6.158 |
| 4,858,895 | A | * | 8/1989 | Buma et al. .............. 267/64.16 |
| 4,973,080 | A | * | 11/1990 | Ikemoto et al. .......... 280/5.501 |
| 5,162,995 | A | * | 11/1992 | Ikemoto et al. ................ 701/38 |
| 6,471,196 | B2 | * | 10/2002 | Stiller ...................... 267/64.16 |
| 6,523,845 | B2 | * | 2/2003 | Stiller .................... 280/124.16 |
| 6,685,174 | B2 | * | 2/2004 | Behmenburg et al. .... 267/64.28 |
| 6,726,189 | B2 | * | 4/2004 | Folchert et al. .......... 267/64.16 |
| 6,874,772 | B2 | * | 4/2005 | Oldenettel ............... 267/64.28 |
| 7,032,895 | B2 | * | 4/2006 | Folchert ................... 267/64.28 |
| 2002/0136645 | A1 | | 9/2002 | Folchert et al. |
| 2002/0166321 | A1 | * | 11/2002 | Oldenettel .................... 60/427 |
| 2004/0026835 | A1 | | 2/2004 | Folchert |

* cited by examiner

*Primary Examiner*—Paul N Dickson
*Assistant Examiner*—Karen Jane J Amores

(57) ABSTRACT

In order to avoid pressure and volume compensation as much as possible during measurement of the pressures of air spring units, the pressure in the air spring units (5, 6, 7, 8) is estimated prior to measurement of the pressures of the air spring units (5, 6, 7, 8) and is compared to the pressure in the air pressure accumulator (3). The higher of the two pressures determines the position of a 3/2 directional control valve (11) which separates the collector line (25) connecting all air spring units (5, 6, 7, 8) from the air pressure accumulator (3) or which connects it to as small a chamber volume of the supply system as possible.

3 Claims, 1 Drawing Sheet

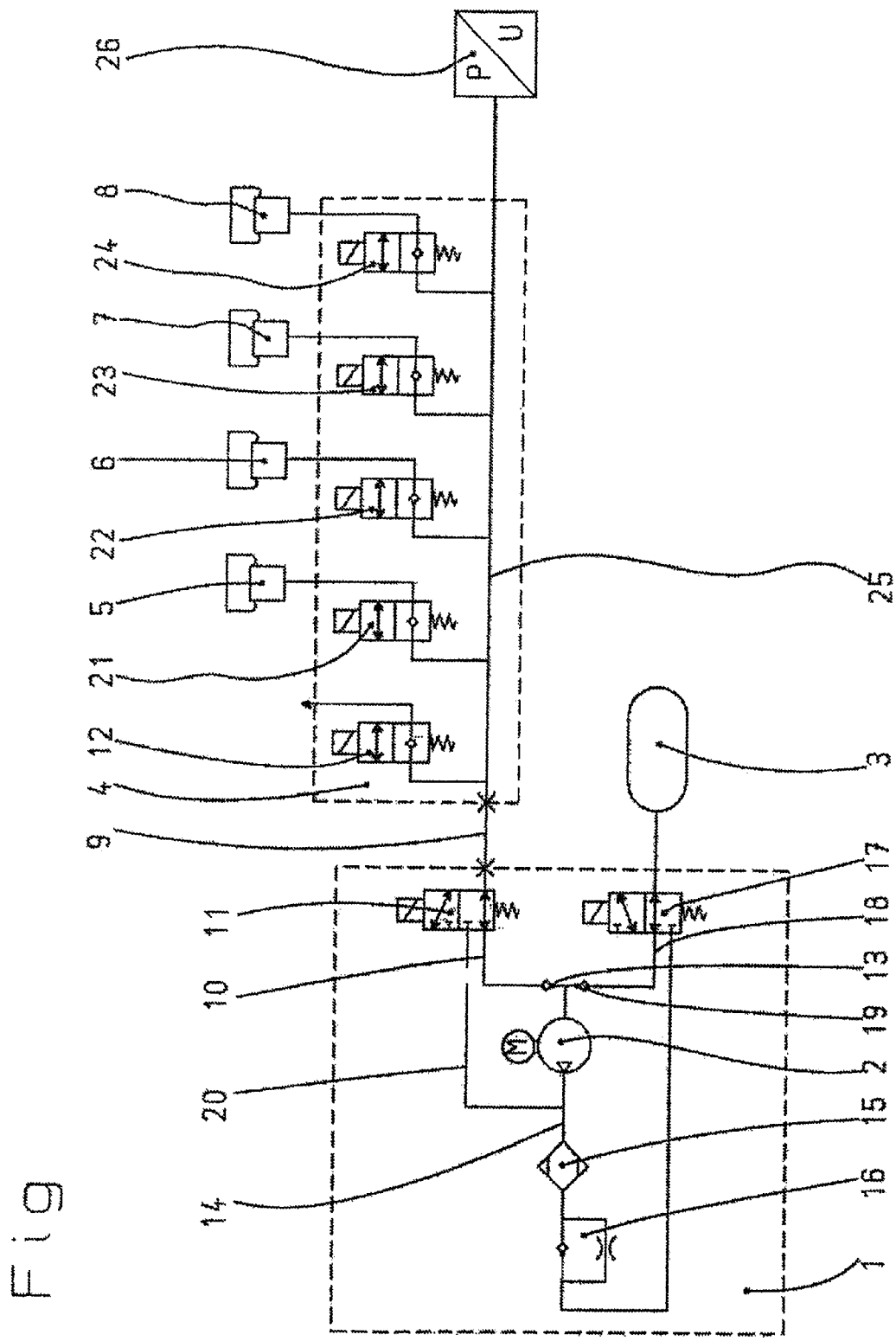

METHOD FOR ADJUSTING THE AMOUNT OF AIR IN A CLOSED AIR SUPPLY SYSTEM FOR A CHASSIS

BACKGROUND OF THE INVENTION

The invention relates to a method for adjusting the amount of air in a closed air supply system for a chassis, in which the pressure is measured in a collector line which connects all the air spring units to one another, and the actual compressed-air amount of the air supply system is calculated therefrom with the inclusion of further known parameters, is compared with a target compressed-air amount and the differential compressed-air amount is equalized accordingly. Air supply systems of this type are used, for example, for the ride height regulation of motor vehicles.

An air supply system of this type is known from EP 1 243 447 A2. According to its FIG. 2, said air supply system comprises substantially an air supply unit and a plurality of air spring units for supporting the vehicle superstructure. A compressor and an air pressure accumulator belong to the air supply unit mainly. Here, the compressor has a first suction line having a connection to atmosphere and a first pressure line which leads to the air pressure accumulator via an air dryer and a first 3/2-way valve. The compressor therefore supplies the air pressure accumulator with air from atmosphere. In addition, the compressor has a connection to the air spring units via a second suction line and via a second 3/2-way valve. The compressor fills compressed air from the air spring units into the air pressure accumulator via said second suction line and via its first pressure line. The compressor has a connection to the air pressure accumulator via a third suction line and via the first 3/2-way valve, and has a connection to the air spring units via a second pressure line and via the second 3/2-way valve. As a result, compressed air is conveyed out of the air pressure accumulator into the air spring units.

The air spring units are arranged parallel to one another, each air spring unit being assigned a 2/2-way valve and all 2/2-way valve units being connected to the air supply unit via a collector line. A pressure sensor is situated in the common collector line of the directional valve unit.

Closed air supply systems of this type operate within a predetermined performance range, the limits of which can be undershot by compressed air escaping through a leak or the pressure volume being reduced by a temperature drop, or the limits of which can be exceeded by the pressure volume being increased by a temperature rise. Within the ride height regulation of the vehicle, this has the effects that raising of the vehicle superstructure is slowed down if the pressure volume is too small, and that lowering of the vehicle superstructure is slowed down if the pressure volume is too high.

In order to ensure the performance range within its permissible limits, the pressure in the air spring units and in the accumulator has to be checked constantly, in order to refill compressed air into the air pressure accumulator in time or to discharge compressed air out of the air pressure accumulator. The performance range is monitored by a regular measurement of the pressure in the air spring units and in the air pressure accumulator in order to determine the overall pressure volume in the air supply system. For pressure measurement in the air spring units, the corresponding 2/2-way valves are opened one after another in the event of a corresponding shut-off position of the two 3/2-way valves in the supply unit, and the pressures which are set in the collector line in the process one after another are measured with the aid of the pressure sensor. For pressure measurement in the air pressure accumulator, flow is applied to the corresponding 3/2-way valves, in order that the pressure from the air pressure accumulator prevails at the pressure sensor. The requirement or the excess of compressed air volume is calculated from the pressures which are measured in the collector line for the air spring units and the air pressure accumulator, and the corresponding switching positions are implemented on the 3/2-way valves, in order to equalize the compressed-air amounts in the air pressure accumulator.

However, this method has disadvantages. For instance, if the 2/2-way valves are opened, pressure volume equalization occurs between the air spring units on one side and the collector line including the dryer and compressor volume on the other side on account of different pressures. This delays the pressure measurement, because the pressure in the collector line has to be equalized with the pressure in the air spring units before the measurement. Moreover, a change in the height of the air spring units and therefore of the vehicle superstructure necessarily occurs as a result of the pressure volume equalization. Undesired changes of this type in the vehicle height during the pressure measurement and during the valve switching are a safety risk, especially as the magnitude of the height changes cannot be estimated in advance. Here, the safety risk rises as the load becomes greater.

The invention is therefore based on the object of developing a method of the generic type, with which possible pressure and volume equalization operations via the switchable valves are avoided as far as possible.

SUMMARY OF THE INVENTION

This object is achieved by a method of the above-mentioned type in which, prior to the measurement of the pressure in the collector line (25), the pressure in the air spring units is estimated on the basis of known parameters and is then compared with the known pressure of the air pressure accumulator, with the collector line being separated from the air pressure accumulator and all equal pressure chamber volumes in the event of a higher pressure in the air pressure accumulator, and with the collector line being connected to a smallest possible chamber volume in the event of a higher estimated pressure in the air spring units.

The novel method for adjusting the amount of air eliminates the abovementioned disadvantages of the prior art. The pressures are equalized to a very great extent via the corresponding 2/2-way valves by way of the estimation of the pressures in the air spring units and the switching of a directional valve which is based thereon, with the result that the sudden changes in the height of the vehicle superstructure which are otherwise customary during the pressure measurements are almost completely absent. This is to be attributed to the fact that, if there is a higher pressure in the air pressure accumulator, there is no connection from the air pressure accumulator to the air spring units and, if there is a higher estimated pressure in the air spring units, the air spring units are connected only to a chamber volume of minimum limits. As a result, the risk during the pressure measurement is reduced substantially. A further advantage consists in the fact that the pressures are equalized very quickly via the 2/2-way valves of the air spring units on account of the only small compressed-air amounts. This makes the reactions of the adjustment of the amount of air in the air supply system more rapid.

Here, it is of advantage that the chamber volume which is provided for the pressure measurement is regulated by a 3/2-way valve which is already present. This saves the installation of an additional control valve. It is possible by way of the 3/2-way valve which is already present to bypass the compressor in the event of a higher estimated pressure in the air spring units and thus to incorporate only the dryer with its relatively small chamber volume into the collector line of the air spring units.

The invention is to be explained in greater detail using one exemplary embodiment.

BRIEF DESCRIPTION OF THE DRAWING

The single figure shows a function diagram of a closed air supply system.

DETAILED DESCRIPTION OF THE DRAWING

According to this figure, the air supply system comprises substantially a supply unit 1 having a compressor 2 and an air pressure accumulator 3, and a directional valve unit 4 which is connected to four air spring units 5, 6, 7, 8 which are arranged parallel to one another. Here, in a customary manner, two air spring units, for example 5 and 6, are assigned to the front axle and the two other air spring units 7 and 8 are accordingly assigned to the rear axle of the chassis.

The supply unit 1 and the directional valve unit 4 are connected to one another via a connecting line 9.

The compressor 2 of the supply unit 1 has a first suction line 10 which is connected to atmosphere via a first 3/2-way valve 11 in the supply unit 1, the connecting line 9 and via a 2/2-way valve 12 in the directional valve unit 4. Here, a nonreturn valve 13 which opens in the direction of the compressor 2 is situated in the first suction line 10. On the pressure side, the compressor 2 has a first supply line 14 which leads to the air pressure accumulator 3 and in which an air dryer 15, a throttling nonreturn valve 16 which opens in the direction of the air pressure accumulator 3, and a second 3/2-way valve 17 are arranged in series. The air spring units 5, 6, 7, 8 are also connected to the air pressure accumulator 3 via said first suction line 10 and the first supply line 14. The compressor 2 has a second suction line 18 which is connected to the air pressure accumulator 3 via the second 3/2-way valve 17 and in which a nonreturn valve 19 which opens in the direction of the compressor 2 is situated. Furthermore, on the pressure side, the compressor 2 is equipped with a second supply line 20 which leads via the first 3/2-way valve 11 of the supply unit 1 and via the connecting line 9 to the directional valve unit 4 and therefore to the air spring units 5, 6, 7 and 8.

In addition to the 2/2-way valve 12 for connection to atmosphere, four further 2/2-way valve units 21, 22, 23, 24 which are arranged parallel to one another are situated in the directional valve unit 4. Here, each 2/2-way valve 21, 22, 23, 24 is connected on one side to the supply unit 1 via a collector line 25 and via the connecting line 9, and on the other side in each case to one of the air spring units 5, 6, 7, 8. A pressure sensor 26 is situated in the collector line 25 of the directional valve unit 4.

In order to fill the air pressure accumulator 3 with air from atmosphere, the 2/2-way valve 12 in the directional valve unit 4 is opened and the first 3/2-way valve 11 of the supply unit 1 is situated in the position without flow (shown), in which the suction side of the compressor 2 is connected to the directional valve unit 4, and the second 3/2-way valve 17 occupies the position with flow (not shown) which connects the pressure side of the compressor 2 to the air pressure accumulator 3. The compressor 2 sucks in air from atmosphere via the open 2/2-way valve 12 and the suction line 10, and conveys the compressed air through the first supply line 14 and the second 3/2-way valve 17 into the air pressure accumulator 3.

In order to fill the air spring/damper units 5, 6, 7, 8 with dried air from the air pressure accumulator 3, the second 3/2-way valve 17 is situated in the position without flow and the first 3/2-way valve 11 is situated in the position with flow. This results in a connection between the air pressure accumulator 3 and the air spring units 5, 6, 7, 8 via the second 3/2-way valve 17, the compressor 2 and the first 3/2-way valve 11. Here, the 2/2-way valve 12 of the directional valve unit 4 is situated in the shut-off position without flow and the corresponding 2/2-way valves 21, 22, 23, 24 are situated in the passage position with flow.

In order to keep the performance of the air supply system consistent within its limits, the pressure volume in the air spring units 5, 6, 7, 8 and in the air pressure accumulator 3 has to be monitored and measured constantly, in order to supply the air pressure accumulator 3 with additional compressed air or in order to discharge an excess compressed-air amount out of the air pressure accumulator 3.

The following method is applied for this purpose:

First of all, the pressure in the corresponding air spring units 5, 6 of a vehicle axle, for example the front axle, is estimated. This estimation is carried out on the basis of values based on experience and with the inclusion of known parameters which can be determined easily. These parameters include, for example, the current height of the vehicle superstructure. Said vehicle superstructure height can be determined, for example, using the extended length of the piston rods of the air spring units 5, 6 by height sensors which are attached to each axle or to each air spring unit.

The parameters also include the current pressure of the air pressure accumulator 3 in conjunction with the loading characteristics. Here, the current pressure of the air pressure accumulator 3 is measured in a simple manner by the two 3/2-way valves 11, 17 being switched into the corresponding positions and the air pressure accumulator 3 therefore being connected to the pressure sensor 26 in the directional valve unit 4. The loading characteristics which correspond to the pressure distribution on the two axles of the controlled vehicle with a defined loading scenario result from the specific vehicle characteristics. These loading characteristics are determined by preceding measurements in various loading states between small and full.

The pressure in the air spring units 5, 6 which is estimated in this way is compared first of all with the pressure in the air pressure accumulator 3.

If the pressure in the air pressure accumulator 3 is greater than the estimated pressure in the air spring units 5, 6, the first 3/2-way valve 11 is moved into the position without flow. As a result, the connection from the air pressure accumulator 3 via the compressor 2 and the second supply line 20 to the air spring units 5, 6 is interrupted and, at the same time, the connection via the first suction line 10 is shut off by the nonreturn valve 13 which is loaded by the higher accumulator pressure. The volume of the collector line 25 is therefore separated from the volumes of the air pressure accumulator 3, the compressor 2 and the dryer 15.

The 2/2-way valves 21, 22 are now opened one after another, with the result that an equalization of the pressures on both sides of the 2/2-way valves 21, 22 occurs. Here, only a small equalization of the pressure volume between the air spring units 5, 6 and the collector line 25 takes place on account of the low and limited volume in the collector line 25, with the result that only an insubstantial elevation of the vehicle superstructure also takes place.

Subsequently, the pressure in the collector line 25 is measured with the aid of the pressure sensor 26, which pressure corresponds at the same time to the pressure in the corresponding air spring unit 5, 6.

If the estimated pressure in the air spring units 5, 6 is higher than the pressure in the air pressure accumulator 3, the first 3/2-way valve 11 is moved into the position with flow. As a result, the collector line 25 is connected via the second supply line 20 only to the volume of the dryer 15, bypassing the compressor 2.

In this position of the 3/2-way valve 11, the 2/2-way valves 21, 22 are opened again, with the result that a pressure equalization occurs via the 2/2-way valves 21, 22.

Here, a compensation of the pressure volume takes place between the volume of the air spring units 5, 6 on one side and the volumes of the collector line 25 and the dryer 15 on the other side, which equalization is again only very small, however, on account of the low and limited volume in the collector line 25 and the dryer 15. The vehicle height will therefore be reduced only to an insubstantial extent.

Subsequently, the pressure in the collector line 25 is measured again with the aid of the pressure sensor 26, which pressure corresponds at the same time to the pressure in the corresponding air spring unit 5, 6.

The pressures for the air spring units 7, 8 of the rear axle are determined according to the same method, the measured pressures for the air spring units 5, 6 of the front axle being incorporated into the estimation of the pressures for the air spring units 7, 8 of the rear axle. This makes the estimation for the rear axle even more accurate.

The pressure volume of the closed air supply system is calculated using the known volume of the air pressure accumulator 3 and the measured pressure of the air pressure accumulator 3 and using the volume of the air spring units 5, 6, 7, 8 which is determined via a displacement sensor and the pressure of the air spring units 5, 6, 7, 8 of both vehicle axles which is determined via the estimation described. The result of this is a conclusion as to whether there is a requirement for or an excess of compressed air volume in the air supply system. Accordingly, the 2/2-way valve 12 and the two 3/2-way valves 11, 17 are switched in a known manner, in order to discharge compressed air out of the air pressure accumulator 3 or to feed compressed air into the air pressure accumulator 3.

LIST OF DESIGNATIONS

1 Supply unit
2 Compressor
3 Air pressure accumulator
4 Directional valve unit
5 Air spring/damper unit
6 Air spring/damper unit
7 Air spring/damper unit
8 Air spring/damper unit
9 Connecting line
10 First suction line
11 First 3/2-way valve
12 2/2-way valve
13 Nonreturn valve
14 First supply line
15 Air dryer
16 Throttling nonreturn valve
17 Second 3/2-way valve
18 Second suction line
19 Nonreturn valve
20 Second supply line
21 2/2-way valve
22 2/2-way valve
23 2/2-way valve
24 2/2-way valve
25 Collector line
26 Pressure sensor

The invention claimed is:

1. A method for adjusting the amount of air in a closed air supply system for a chassis with a plurality of air spring units, a compressor (2) with a suction side and a pressure side, a collector line connecting all the air spring units with one another, an air pressure accumulator, the suction side being connected to a first suction line (10) and a second suction line (18), each intake line (10, 18) having a nonreturn valve (13, 19) opening in the direction toward the suction side, a second supply line (20) connecting the pressure side to the collector line (25) via a first 3/2 way valve (11), a first supply line (14) connecting the pressure side to the air pressure accumulator (3) via a second 3/2 way valve (17), the first 3/2 way valve (11) connecting the collector line (25) with either the second supply line (20) or with the first suction line (10), the second 3/2 way valve (17) connecting the air pressure accumulator (3) either with the first supply line (14) or with the second suction line (18), the method comprising the steps of
estimating the pressure in the air spring units (5, 6, 7, 8) on the basis of known parameters
comparing the estimated pressure in the air spring units with a known pressure of the air pressure accumulator (3),
connecting the collector line (25) to the first suction line (10) in the event the pressure in the air pressure accumulator (3) is higher than the estimated pressure in the air spring units (5, 6, 7, 8),
connecting the collector line (25) to the second supply line and connecting the air pressure accumulator (3) to the second suction line in the event that the estimated pressure in the air spring units (5, 6, 7, 8) is higher than the pressure in the air pressure accumulator (3),
measuring the pressure in the collector line (25),
calculating therefrom an actual compressed-air amount of the air supply system with the inclusion of further known parameters,
comparing the actual compressed-air amount with a target compressed-air amount to obtain a differential compressed-air amount, and
equalizing the differential compressed-air amount accordingly.

2. The method as claimed in claim 1, wherein the known parameters for estimating the pressure in the air spring units (5, 6, 7, 8) comprise at least one member of the group consisting of vehicle height, current loading and loading characteristics of the vehicle.

3. The method as claimed in claim 2, wherein the pressure in the air spring units (5, 6) of one vehicle axle is estimated and measured and then the pressure in the air spring units (7, 8) of another vehicle axle is estimated and measured, the measured pressure in the air spring units (5, 6) of the one axle being included for the estimation of the pressure in the air spring units (7, 8) of the other axle.

* * * * *